United States Patent [19]

Demangeon et al.

[11] Patent Number: 4,970,025

[45] Date of Patent: Nov. 13, 1990

[54] CATIONIC EMULSIONS OF BITUMINOUS BINDERS OF THE TYPE BITUMEN/POLYMER AND CATIONIC EMULSIFYING SYSTEM PREFERABLY UTILIZABLE FOR OBTAINING SAID EMULSIONS

[75] Inventors: Francis Demangeon, Dardilly; Emile Lopez, Vienne, both of France

[73] Assignee: Elf France, Paris, France

[21] Appl. No.: 216,867

[22] Filed: Jun. 8, 1988

Related U.S. Application Data

[62] Division of Ser. No. 932,502, filed as PCT FR86/00040 on Feb. 12, 1986, Pat. No. 4,772,648.

[30] Foreign Application Priority Data

Feb. 15, 1985 [FR] France .................................. 85 02211

[51] Int. Cl.$^5$ ...................... B01F 17/16; B01F 17/20; C08L 5/00; C08L 75/00
[52] U.S. Cl. .................................... 252/357; 106/205; 106/277; 252/311.5; 524/61; 524/98; 524/99; 524/104; 524/115; 524/121; 524/126
[58] Field of Search ............... 252/311.5, 357; 524/61, 524/98, 115, 121, 126, 99, 104; 106/205, 277

[56] References Cited

U.S. PATENT DOCUMENTS

| | | | |
|---|---|---|---|
| 2,862,831 | 12/1958 | Mertens | 106/277 |
| 4,171,295 | 10/1979 | Frese et al. | 524/60 |
| 4,370,170 | 1/1983 | Tolonen et al. | 252/311.5 |
| 4,494,992 | 1/1985 | Schilling et al. | 252/311.5 |
| 4,576,648 | 3/1986 | Denangeon et al. | 524/60 |

*Primary Examiner*—Allan M. Lieberman
*Attorney, Agent, or Firm*—Burgess, Ryan and Wayne

[57] ABSTRACT

This invention provides cationic emulsions of bituminous binders of the bitumen/polymer type, formed by a dispersion of an organic phase of the binder in an aqueous phase containing a cationic nitrogenous emulsifier and a mineral or organic acid, the acid being in appropriate quantity so that the pH of the aqueous phase is comprised between 3 and 9. The aqueous phase also contains an agent consisting of at least one water-soluble sequestering salt of phosphonic acid, particularly a salt of alkaline metal or of amine of hydroxyalkyl-1,1-diphosphonic acid, and optionally a water-soluble thickening agent. To obtain the emulsions, which are usable for road applications, the emulsifying agent, the sequestering agent and optionally the thickening agent may be used in the form of a premixture containing the agents and called cationic emulsifying system.

25 Claims, No Drawings

CATIONIC EMULSIONS OF BITUMINOUS BINDERS OF THE TYPE BITUMEN/POLYMER AND CATIONIC EMULSIFYING SYSTEM PREFERABLY UTILIZABLE FOR OBTAINING SAID EMULSIONS

This is a division of application Ser. No. 932,502, filed Oct. 14, 1986, now U.S. Pat. No. 4,772,648. Priority is claimed under 35 USC 119 based on French PCT/FR 86/00040 filed Feb. 12, 1986, based on French patent application No. 85,02211 filed Feb. 15, 1985, a certified copy of which is of record in the file of the parent application Ser. No. 932,502.

FIELD OF THE INVENTION

The invention relates to cationic emulsions of bituminous binders of the bitumen/polymer type. In one aspect, the invention relates to a cationic emulsifying system preferably utilizable for obtaining these emulsions.

BACKGROUND OF THE INVENTION

Converting bituminous binders in cationic or anionic emulsions is a well-known technique. The emulsion consists of a dispersion of fine bitumen globules in a continuous aqueous phase. The emulsion is called anionic or cationic according to the total electrical charge surrounding the globule which can be negative or positive. In the presence of a continuous electric current, the micellae of bitumen of an emulsion settle on the anode if the emulsion is anionic or on the cathode if the emulsion is cationic.

The conversion of bituminous binders to emulsion makes use of emulsifying agents that favor the dispersion of the globules of binder in the aqueous phase by forming a charged protective shell that prevents their agglomeration.

In the case of anionic emulsions, the emulsifying agent is of the anionic type and preferably consists of a fatty acid alkaline salt. This emulsifying agent is generally mixed with the bituminous binder in a quantity of from 0.05 to 2% by weight. The binder containing the emulsifying agent is then dispersed in an alkaline aqueous phase by passing into an emulsifier.

Cationic emulsions are obtained by using cationic emulsifying agents, which generally consist of nitrogenized organic compounds such as fatty amines, fatty amidoamines, fatty imidoazolines, fatty mono and diquaternary ammonium compounds and reaction products of one or more of said products with ethylene or propylene oxide. The fatty radical of the emulsifying compounds can possess a very diversified chemical structure and the raw materials for the preparation of the emulsifying compounds can originate from different sources such as animal fats, refined petroleum products, vegetable oils and liquid resins. The cationic emulsifying agent is generally dispersed in water to which hydrochloric acid is added. The hydrochloride formed is soluble. The homogeneous solution thus obtained, having a pH generally comprised between 1 and 5, is then put into contact with the bituminous binder in an emulsifier in order to form the emulsion.

Regardless of whether it is anionic or cationic, the emulsion is considered to be a means that allows lowering the viscosity of bituminous binders. The emulsion restores, after rupture, the bituminous binder to which has been added the emulsifying agent used for producing the emulsion. The presence of this emulsifying agent in the bituminous binder is regarded as exerting a favorable effect on the adhesiveness of the binder in the presence of mineral surface, provided it is within a narrow range of pH comprised between 1 and 6.

The largest sale of bituminous emulsions is mainly in the area of building and repair of roads, and essentially in the form of cationic emulsions. Experience in this field shows that cationic emulsions are easier to apply and prevent the numerous inconveniences of anionic emulsions such as the possibility of restoration to emulsion in the presence of water, of unforeseeable rupture in storage and of weak adhesiveness of the binder to the surface of the aggregate.

Cationic bituminous emulsions are mainly used according to two type of technique, namely, coating and encasing.

Coating consists in gluing layers of fine gravel on the surface of the road by means of the bituminous emulsion in order to produce roughness and make the surface impervious. This technique contributes to the creation of a new runway layer.

In encasement, the bituminous emulsion allows the use of layers having a thickness of from 0.4 cm to more than 20 cm, which integrate in all levels of a road structure.

At present, due to the general reduction of budgets for repair and building of roads, the use of the bitumen emulsion is particularly limited to the repair of the surface of roads. However, due to the extreme mechanical demands to which are subjected the mosaics of the surface coatings, the road bitumens of emulsifiable kinds do not have the characteristics necessary that will allow them to bear the tangential stresses due to heavy loads and heavy traffic.

Under these circumstances, the bituminous binders exclusively constituted of bitumen are being increasingly replaced by bituminous binders of the bitumen/polymer type. The bitumen/polymer binders are products obtained from bitumens to which polymers have been added and have eventually been modified by the latter. Optionally, a reagent such as sulfur or a modifying agent and/or an adjuvant can also be present.

Examples of bituminous binders of the bitumen/polymer type comprise preferably:

bitumens modified by olefinic polymers or by mixtures of fatty acids and higher alcohols (French Pat. No. 7,627,936 [publication No. 2,364,960] of Sept. 17, 1976);

bitumens modified as above and on which have been grafted elastomers (French Pat. No. 7,627,937 [publication No. 2,364,961] of Sept. 17, 1976);

bitumens modified by norbornene (French Pat. No. 7,630,316 [publication No. 2,367,102] of Oct. 8, 1976);

bitumens modified by dihalopolybutadienes serving as receptive structures to block copolymers and to covulcanizable elastomers (French Pat. No. 7,806,160 [publication No. 2,418,812] of Mar. 3, 1978);

bitumens modified by block copolymers styrene/butadiene or styrene/isoprene (French Pat. No. 7,639,233 [publication No. 2,376,188] of Dec. 28, 1976);

bitumens modified by block copolymers styrene/carboxylated diene (addition No. 7,831,689 [publication No. 2,440,967] of Nov. 9, 1978 to French Pat. No. 7,639,233);

bitumens modified by polyethylene waxes (French Pat. No. 7,729,953 [publication No. 2,405,288] of Oct. 5, 1977);

bitumens modified by elastomeric acrylic polymers (French Pat. No. 7,812,135 [publication No. 2,424,301] of April 25, 1978;

bitumens modified by polymers of the type polyvinyl alcohol, polyamide, polyester, polyurethane;

bitumens modified by olefinic copolymers, preferably among them, ethylene/propylene copolymers or ethylene/propylene/diene copolymers, or by copolymers of olefins and of vinyl monomers, preferably ethylene/vinyl acetate copolymers, ethylene/acrylic ester copolymers, ethylene/vinyl chloride copolymers;

bitumens modified by special polymers of the type of halogenated polymers and preferably fluorinated polymers such as poly-tetrafluoroethylenes or fluorinated and chlorinated polymers, or of the type of silicon polymers such as polysiloxanes;

bituminous compositions obtained by bringing into contact one bitumen with a mother solution containing one polymer, preferably one block copolymer styrene/-conjugated diene and sulfur or a polysulfide or another reactive agent, preferably vinyl monomer, as well as a petroleum fraction and/or a coal oil (French Pat. Nos. 7,818,534 [publication No. 2,429,241] of June 21, 1978 and No. 8,210,095 [publication No. 2,528,439] of June 10, 1982; French Pat. Nos. 7,910,987 [publication No. 2,455,623] of May 2, 1979 and No. 8,216,433 [publication No. 2,533,935] of Sept. 30, 1982);

bitumens modified by a mixture of at least two of the polymers cited above, and mixtures of said modified bitumens.

However, the emulsification of said different bitumens modified by the incorporation of polymers cannot be effected as such, since the improvement on the properties of the bitumens systematically increases the viscosity of the medium, which hinders the preparation of binders modified by polymers making use of the conventional industrial equipments. Under these circumstances, it is necessary to use one or several fluidizing solvents, the main part they play being to reduce the viscosity of the medium and bring it to a range equivalent to that of operation of bitumens of penetration 80/100 and 180/220 between 100° C. and 150° C., that is, 1 to 10 poises. The solvent or solvents selected have among other properties that of being partially volatile while preserving the heavy fractions of plastifying and compatibilizing properties between the polymer and the bitumen.

The applicant has observed that the formulation of emulsions of quick rupture from binders of the bitumen/polymer type fluidized or fluxed by oils of petroleum origin or resulting from the distillation of coal in the presence of conventional cationic emulsifying agents such as those mentioned above, led to emulsions in which the rupture is poor or uncertain. It has been observed, on the other hand, that this rupture was represented by a partial coagulation of the bitumen globules without ever resulting in the first hours, even after several days, in the total coalescence of the micellae of the emulsion, and this, whatever the type of emulsifying agent used and the concentration of said emulsifying agent. This deficiency confers on the residual bituminous binder mechanical characteristics which are very inferior to those of the original anhydrous bitumen/-polymer binder. Therefore, it limits the development of the emulsions of bitumen/polymer binder in the field of producing thin and superficial coatings on roads having very heavy traffic. The applicant has demonstrated in addition that the phenomenon exclusively depended on a double interaction between the solvent and the emulsifying agent for a conventional emulsifying agent such as defined above and between the solvent and the salts contained in the water, namely, alkaline earth salts and metallic salts. The nature of the bitumen and its origin, the type of polymer associated with the bitumen, and the presence of crosslinking or stabilizing reagent, on the contrary, exert no influence on the phenomenon.

SUMMARY OF THE INVENTION

It has been found that the deletereous influence of the interactions between solvent and emulsifying agent and between solvent and salts contained in the water could be suppressed by using in the cationic emulsion of bitumen/polymer binder a specific emulsifying system that results from the association of at least one cationic nitrogenized emulsifying agent with an adjuvant consisting of at least one water-soluble sequestering salt of phosphonic acid.

Therefore, an object of the invention is to provide cationic emulsions of bituminous binders of the bitumen/polymer type that are formed in a dispersion of an organic phase consisting of the bitumen/polymer binder in an aqueous phase including a cationic nitrogenized emulsifying agent and an acid, the latter being present in an amount such that the pH of the aqueous phase has a value comprised between 3 and 9, the emulsions being characterized by the fact that their aqueous phase also includes an adjuvant consisting of at least one water-soluble sequestration salt of phosphonic acid in which the sequestering power in relation to the metallic ions is equivalent, in a pH range of from 3 to 9, to a fixation of at least 5 mg calcium ions per gram of salt.

DETAILED DESCRIPTION OF THE INVENTION

The water-soluble sequestering phosphonic salt or salts are preferably selected among the diphosphonic salts of the formula (I)

wherein $R_1$ is a hydrocarbyl radical of $C_1$ to $C_{10}$, preferably an alkyl, cycloalkyl or aryl radical of $C_1$ to $C_6$, and the M symbols, which can be identical or different, each designate a hydrogen atom or an $M_1$ group in a manner such that at least one M is an $M_1$ group the $M_1$ group representing one alkaline metal atom, the radical

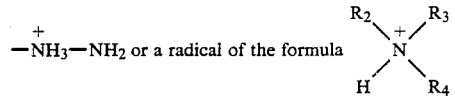

wherein the symbols $R_2$ to $R_4$, which can be identical or different, each represents one hydrogen atom or an organic radical and in particular a hydrocarbyl monovalent radical of $C_1$ to $C_8$, preferably $C_1$ to $C_6$, and which may include one or several functional groups and particularly an OH group, some of the $R_2$ to $R_4$ radicals can be combined to form a heterocycle with the nitrogen atom to which they are bonded. The salts themselves are not emulsifying agents.

The alkaline metal that can represent the $M_1$ group is selected among the metals of group IA of the Periodic Classification of Elements such as shown in the HANDBOOK OF CHEMISTRY AND PHYSICS, 46th Edition, published by THE CHEMICAL RUBBER CO., the alkaline metal preferably consisting of sodium or potassium.

The hydrocarbyl radicals eventually replaced by functional groups that can represent the symbols $R_2$ to $R_4$ are in particular alyl or hydroxyalkyl radicals of $C_1$ to $C_8$, preferably $C_1$ to $C_6$, such as methyl, ethyl, propyl, butyl, pentyl, hexyl, hydroxymethyl, hydroxyethyl, hydroxypropyl, or also cycloalkyl radicals of $C_4$ to $C_8$, preferably cyclopentyl or cyclohexyl, or aromatic radicals of $C_6$ to $C_8$ such as phenyl or tolyl.

When some of the $R_2$ to $R_4$ radicals are combined to form a heterocycle with the nitrogen atom to which they are bonded, the heterocycle is in particular aromatic and preferably of the pyridinic or alicyclic and preferably of the piperidinic type.

The compounds of formula (I) are preferably the salts resulting from the reaction of the hydroxyhydrocarbyl-1,1-diphosphonic acid of formula (II)

$$\begin{array}{ccc} OH & R_1 & OH \\ | & | & | \\ O=P—&C—&P=O \\ | & | & | \\ OH & OH & OH \end{array} \quad (II)$$

with a compound selected among the hydroxides of the alkaline metals of group IA of the Periodic Classification of Elements defined above, anhydrous or hydrated ammonia, hydrazine and the amine of the formula $$\begin{array}{c} R_2 \\ / \\ N \\ | \ \backslash \\ R_4 \ R_3 \end{array}$$

wherein the symbols $R_1$ to $R_4$ having the meanings given above.

The concentration of the phosphonic salt water-soluble in the aqueous phase of the emulsion can vary widely according to the hardness of the water used for producing the emulsion and/or the total content of metallic ions of this water. This concentration can advantageously represent 0.005% to 0.5% and preferably 0.01% to 0.3% by weight of the emulsion.

The cationic nitrogenized emulsifying agent present in the emulsion can consist of one or several of the cationic nitrogenized emulsifying agents known, the emulsifying agents can be preferably fatty monoamines, polyamines, amidoamines, amidopolyamines, salts or oxides of said amines and amidoamines and reaction products of the above cited compounds with ethylene oxide and/or propylene oxide. A general illustration of cationic nitrogenized emulsifying agents among which can be selected the emulsifying agents utilizable according to the invention is given in the manual of KIRK-OTHMER entitled ENCYCLOPEDIA OF CHEMICAL TECHNOLOGY, third edition, volume 22, pages 377 to 384.

According to an advantageous embodiment of the invention, the cationic nitrogenized emulsifying agent is formed by the association of one or several emulsifying agents A selected among the cationic nitrogenized emulsifying agents of the type monoamines, diamines, amidoamines, oxides of said amines or amidoamines, reaction products of said compounds with ethylene and/or propylene oxide and quaternary ammonium salts with one or several emulsifying agents B selected among the cationic nitrogenized emulsifying agents possessing in their molecule at least three functional groups selected among the amines and amides groups in a manner such that one at least of said functional groups be an amine group, the weight ratio of the total quantity of the compound or compounds A to the total quantity of A and B compounds being in particular from 5% to 95%. This mode of operation results in an open and quick rupture of the emulsion which allows the bitumen/polymer binder immediately to recover its initial properties.

The cationic nitrogenized emulsifying agent that can be used according to the invention can consist preferably of one or several cationic nitrogenized emulsifying agents selected among the following compounds:

fatty monoamines of formula (III) $R_6$-NH2, wherein $R_6$ represents a fatty hydrocarbon radical and preferably an alkyl or alkenyl radical $C_8$ to $C_{22}$ such as lauryl, stearyl, oleyl, and polyamines and amidopolyamines of formula (IV)

$$R—X(C_nH_{2n})—NH_2 \quad (IV)$$

wherein X represents a divalent group of the formula $$—(CO)_r—NH\hspace{-2pt}+\hspace{-2pt}C_mH_{2m}—NH\hspace{-2pt}+_{\overline{p}} \quad \text{or} \quad —C \begin{array}{c} \diagup N \ \rceil \\ \hspace{8pt} (C_qH_{2q}), \\ \diagdown N \ \rfloor \\ | \end{array}$$

R is a hydrocarbyl radical and preferably alkyl or alkenyl having up to 22 carbon atoms, preferably $C_8$ to $C_{22}$, m and n, which can be identical or different, are integers of from 1 to 8, preferably from 1 to 6, p is a number taking whole values of 0 to 6, preferably 0 to 3, r is equal to 0 or 1 and q is an integer of from 2 to 10, preferably from 2 to 4. In the mode of operation for which the cationic nitrogenized emulsifying agent includes one or several cationic nitrogenized emulsifying agents A associated with one or several cationic nitrogenized agents B such as generally defined above, the emulsifying agents A can be in particular selected among:

the monoamines of formula (III)

the diamines and amidodiamines of formula (V)

$$R—(CO)_r—NH—(C_nH_{2n})—NH_2 \quad (V)$$

the amines of formula (VI)

$$R—C \begin{array}{c} \diagup N \ \rceil \\ \hspace{8pt} (C_qH_{2q}) \\ \diagdown N \ \rfloor \\ \phantom{|}\llap{\rule[-2pt]{0pt}{10pt}}—(C_nH_{2n})—NH_2 \end{array} \quad (VI)$$

the quaternary ammonium compounds of formula (VII)

$$(R_7)_jN^+(R_8)_hY^- \quad (VII)$$

while the emulsifying agents B can in particular be selected among the polyamines or amidopolyamines of formula (VIII)

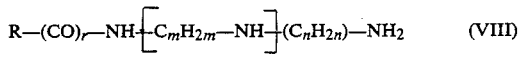
$$R-(CO)_r-NH+[C_mH_{2m}-NH]_q(C_nH_{2n})-NH_2 \quad (VIII)$$

s representing in these formulae an integer from 1 to 6, preferably from 1 to 3, the $R_7$'s, which can be identical or different, designate $C_6$ to $C_{22}$ hydrocarbyl radicals which can be substituted with one or several functional groups and preferably alkyl or alkenyl radicals from $C_8$ to $C_{22}$ or a benzyl radical, the $R_8$'s, identical or different, representing alkyl radicals from $C_1$ to $C_6$, which can be hydroxylated, preferably methyl, ethyl, propyl, hydroxyethyl, hydroxypropyl, $Y^-$ designating an anion of a mineral acid, in particular a chloride anion, or of an organic acid, preferably an acetate or formate anion, h being a number equal to $(4-j)$ and j being a number assuming the values 1, 2 or 3, while R, r, m, n and q have the meanings given above.

The preferred cationic nitrogenized emulsifying agents that can be used as emulsifying agents A have the following formulae

$$R_9-(CO)_r-NH-(CH_2)_3-NH_2 \quad (IX)$$

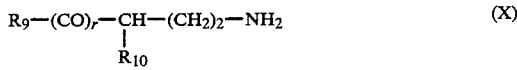
$$R_9-(CO)_r-\underset{R_{10}}{CH}-(CH_2)_2-NH_2 \quad (X)$$

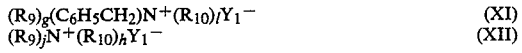
$$(R_9)_g(C_6H_5CH_2)N^+(R_{10})_lY_1^- \quad (XI)$$
$$(R_9)_jN^+(R_{10})_hY_1^- \quad (XII)$$

$R_9$ designating in these formulae an alkyl or alkenyl radical from $C_{12}$ to $C_{22}$, preferably stearyl and/or oleyl, $R_{10}$ designating an alkyl or hydroxyalkyl radical from $C_1$ to $C_3$, $Y_1^-$ being a chloride or acetate anion, l being a number equal to $(3-g)$ and g being a number assuming the values 1, 2 or 3 while r, j and h are numbers having the meanings given above.

Other preferred cationic nitrogenized emulsifying agents that can be preferably used as emulsifying compounds B correspond to the following formulae (XIII) and (XIV):

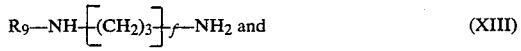
$$R_9-NH+[(CH_2)_3]_f-NH_2 \text{ and} \quad (XIII)$$

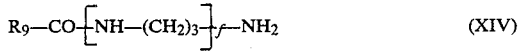
$$R_9-CO+[NH-(CH_2)_3]_f-NH_2 \quad (XIV)$$

wherein f designates a number assuming the values 2, 3, 4 or 5 and $R_9$ has the above meaning.

The total quantity of cationic nitrogenized emulsifying agent in the emulsion can change widely. This quantity can advantageously represent from 0.03% to 3%, preferably from 0.06% to 2%, of the total weight of the emulsion for obtaining emulsions of quick rupture and satisfactory stability.

The acids used for adjusting the pH of the emulsion to a value of from 3 to 9 can be selected among the mineral acids of different degrees of acidity or also among the mono- or polycarboxylic acids, saturated or unsaturated, and eventually hydroxylated which are defined in French Pat. No. 8,122,275 (publication No. 2,517,317) of Nov. 27, 1981. Preferred acids are hydrochloric, nitric, phosphoric, acetic, oxalic, citric and formic acids.

The bitumen-polymer binder reduced to cationic emulsion can be any one of the products obtained from bitumens to which have been added one or several polymers and eventually modified by this or these polymer(s) in the presence or absence of a reagent such as sulfur or an agent that releases sulfur such as a polysulfide, of a coupling or vulcanization agent, it being likewise possible to add to said bitumens, if necessary, a fluxing agent such as a petroleum fraction, a coal oil, or a mixture of said products.

Preferred bitumen/polymer binders can be selected among the different bitumen/polymer binders cited above by way of example.

The emulsion according to the invention can also include a thickening agent consisting of one or several water-soluble organic compounds, which, within a pH range of from 3 to 9, are capable of increasing the viscosity of the emulsion without modifying the viscosity of the aqueous phase alone containing the cationic nitrogenized emulsifying agent.

Among the compounds that can be used as thickening agents, there can preferably be mentioned the water-soluble natural gums of the type guar gum, arabic gum, ghatti gum, karaya gum, tragacanth gum, locust bean gum, or also the water-soluble polyurethanes of low molecular weight, and in particular polyurethanes of molecular weight below 20,000 which result from the reaction of a polyisocyanate such as toluene diisocyanate, diphenyl methane 4,4'-diisocyanate, naphthylene 1,5-diisocyanate, hexamethylene 1,6-diisocyanate, 3,3'-tolidene - 4,4'-diisocyanate and m-phenylene disulphonyl diisocyanate with polyols of the polyester polyol or polyether polyol type. As polyester polyols can be mentioned the reaction products of a polycarboxylic acid such as adipic, phthalic or maleic acid with a polyol or a mixture of polyols such as ethylene glycol, propylene glycol, diethylene glycol, butanediol, glycerol, trimethylol propane, hexamethylene triol and pentaerythritol, while appropriate polyether polyols can be selected among the reaction products of polyols of the ethylene glycol, propylene glycol, glycerol, trimethylol-propane, pentaerythritol, methyl glycoside, sorbitol and sucrose type with epoxides of the ethylene oxide, propylene oxide and epoxystyrene type.

The weight of thickening agent in the emulsion can advantageously represent from 5% to 30% of the total weight of the combination formed by the cationic nitrogenized emulsifying agent, the phosphonic adjuvant and the thickening agent.

The cationic emulsions according to the invention are prepared by making, in a zone of emulsion formation, particularly in an apparatus of the emulsifier type, a homogeneous dispersion of the bitumen/polymer binder in an aqueous phase containing, in quantities adequate for obtaining the concentrations defined above, the emulsifying agent salified by an acid in an amount sufficient for obtaining the desired pH value, the water-soluble phosphonic sequestering agent and optionally the thickening agent. To do this, there are separately and simultaneously brought to the zone of formation of the emulsion, on one side, the bitumen/polymer binder in the form of a molten mass having a temperature between 80° C. and 180° C., preferably between 120° C. and 160° C., and on the other hand, the aqueous phase containing the above mentioned ingredients and preferably between 20° C. and 60° C. and the combination is maintained in said zone for a time sufficient for forming an emulsion.

The aqueous phase, which is mixed with the bitumen/polymer binder in the zone of formation of the emulsion, is prepared by introducing the emulsifying agent, the phosphonic sequestering compound, the acid and the eventual thickening agent in the amount of water necessary for producing the emulsion, which has been previously brought to a temperature comprised between 30° and 75° C. The quantities of emulsifying agent, of phosphonic sequestering compound and of eventual thickening agent which are added to the water are selected in a manner such that the concentrations of said ingredients in the resulting emulsion be within the above defined ranges. The acid is used in a quantity sufficient for transforming, if necessary, the cationic emulsifying agent into a soluble salt and for bring the pH of the emulsion to the selected value. The ingredients, namely, cationic nitrogenized emulsifying agent, phosphonic sequestering compound, acid and thickening agent, can be added to the water in any order. The phosphonic sequestering compound in particular can be introduced in the water before or after salification of the emulsifying agent by the acid. The phosphonic sequestering compound can likewise be formed in situ in the water from the corresponding precursor phosphonic acid and from a base apt to furnish salifying groups $M_1$ such as defined above.

In an advantageous form of preparation, at least the emulsifying agent and the phosphonic sequestering compound, or the phosphonic acid precursor thereof, are simultaneously incorporated into the water in the form of a mixture called cationic emulsifying system which has been previously made, the acid is then added and the thickening agent if it is used.

The cationic emulsifying system includes, therefore, a cationic nitrogenized emulsifying agent consisting of one or more cationic nitrogenized emulsifying agents and an adjuvant consisting of at least one water-soluble phosphonic sequestering compound such as defined above or the phosphonic acid precursor thereof, said adjuvant being in particular formed of at least one phosphonic compound selected among the compounds of formula (I) or the phosphonic acids precursors thereof of formula (II).

In such an emulsifying system the weight of the cationic nitrogenized emulsifying agent represents in particular from 10 to 99%, preferably from 25 to 90%, of the total weight of emulsifying agent and adjuvant.

The cationic nitrogenized emulsifying agent present in the cationic emulsifying system can consist preferably of one or more of the cationic nitrogenized emulsifying agents selected among the fatty monoamines of formula (III) and the polyamines and amidopolyamines of formula (IV).

In a preferred manner of preparation, the cationic nitrogenized emulsifying agent of the cationic emulsifying system is constituted by the association of one or more cationic nitrogenized emulsifying agents A with one or more cationic nitrogenized emulsifying agents B such as defined above, the weight ratio of the total amount of the compound or compounds A to the total amount of compounds A and B being in particular from 5 to 95%.

In particular the compounds A can be selected among the compounds defined above by formulae (III), (V), (VI) and (VII) and preferably among the compounds A defined by formulae (IX), (X), (XI) and (XII), while the B compounds can be selected among the compounds defined above by the formula (VIII) and preferably among the compounds B defined by the formulae (XIII) and (XIV).

The cationic emulsifying system can also contain a thickening agent consisting of one or more water-soluble organic compounds selected among those defined above, and in particular among the water-soluble natural gums or among the water-soluble polyurethanes of low molecular weight and preferably those resulting from the reaction between a polyisocyanate and a polyol of the polyester polyol or polyether polyol type.

The weight of thickening agent in the cationic emulsifying system advantageously represents from 5% to 30% of the total weight of the mixture comprising the emulsifying agent, the phosphonic adjuvant and the thickening agent.

In the preparation of the emulsion, the aqueous phase containing the cationic nitrogenized emulsifying agent, the phosphonic adjuvant, the acid and the thickening agent, on one hand, and the bitumen/polymer binder, on the other, are brought to the zone of formation of emulsion in proportions such that the cationic emulsion resulting advantageously contains by weight from 30 to 85%, preferably from 50 to 80%, of bitumen/polymer binder.

The cationic emulsions of bitumen/polymer binder according to the invention are characterized by a quick and irreversible rupture upon contact with the aggregates at the end of which the bitumen/polymer binder immediately and entirely recovers it initial properties.

The emulsions according to the invention are particularly suited to applications of road building and repair, to caulking in civil engineering or in construction and also to industrial uses.

The invention is illustrated by the examples that follow.

In these examples, which describe cationic emulsions of bituminous binders prepared according to the prior art (control examples) and according to the invention, the quantities appearing below are given to characterize the samples of emulsion prepared:

medium diameter of the globular distribution of the bituminous binder, that is, the value of the diameter corresponding to the value of 50% on the curve of cumulative gravimetric particle-size distribution of the globules of the bituminous binder obtained by laser granulometric analysis;

index of rupture in fine siliceous products (abbreviated IR) determined according to the French standard NF T 66 017 and representing the minimum quantity, expressed in grams of siliceous sand of granulometry from 40 to 150 μm, entailing the rupture of 100 g of emulsion with formation of a bituminous clot sand/binder (a value of the rupture index of about 80 corresponding to a quick rupture of the emulsion, which is what is sought);

time of rupture of the emulsion on plates of bituminous coatings with the aid of microdorite fine gravel having a diameter of from 10 to 14 mm (on a surface formed by a bituminous coating the emulsion is placed, thereafter said emulsion is coated by means of fine gravel, and there is counted from the time the emulsion is covered by the fine gravel, the time that elapses until the rupture of the emulsion, which appears by an attachment of the fine gravel to the support).

Besides, the following characteristics have likewise been determined in the course of the evaluation test of the rupture index:

quantity of liquid salted out after obtention of the clot of fine sands coated by the bituminous binder ruptured and content of water of this liquid (a small amount of liquid containing an elevated amount of water resulting in a quick and open rupture of the emulsion); and cohesion/elasticity of the clot of fine sands coated by the bituminous binder since the formation of said clot, determined by traction test according to the French standard NF T 46 002.

The composition of the liquid, that is, of the water-/emulsion phase salted out during the rupture of the emulsion, objectively shows the quantity of non-ruptured emulsion, this information being related to the phenomenon of delay or arrest in the rupture of the emulsion. A small amount of liquid containing an elevated amount of water corresponds to a quick and open rupture of the emulsion whereas a larger amount of liquid containing a small amount of water shows a slow rupture of the emulsion, which is what has to be prevented.

The immediate cohesiveness or elasticity of the clot of fine siliceous sands coated with bituminous binder is a characteristic that accounts for the coalescence of the mass of globules of the ruptured bituminous binder, and that gives an indication of the capacity of the bituminous binder to recover its initial viscoplastic or elastomeric properties.

The emulsions described in the examples have been prepared using, as the case may be, either city water having a total hardness corresponding to a hydrotimetric standard equal to 22° or an industrial water having a total hardness corresponding to a hydrotimetric standard of 24° and containing 15 mg per liter of ferrous ions.

In the examples given below the quantities and percents are given by weight unless otherwise indicated.

EXAMPLE 1

In this example, which is a control example, there was prepared a cationic emulsion at 70% of a bituminous binder consisting of an ordinary bitumen of 180/220 penetration, as follows. There are formed in the first place an aqueous phase consisting of an aqueous solution of hydrochloride of the emulsifying agent, producing a 0.16% dispersion of propylene diamine-1,3 of tallow (cationic nitrogenized emulsifying agent) in industrial water, thereafter adding to the dispersion 0.14% hydrochloric acid at 20° Be (d=1.16).

The emulsion was then produced in an emulsifier in which there were simultaneously and separately introduced 100 parts of the aqueous phase prepared as indicated above and brought to 45° C., and 700 parts of the bitumen brought to 145° C. There were obtained 1000 parts of a control cationic emulsion the characteristics of which are given below:
PH: 3.5
medium diameter of the bitumen globules (μm): 3–5
index of rupture: 70
amount of salted out liquid after 1 hour (% of the emulsion): 6
amount of water in the salted out liquid (%): 95
cohesiveness of the clot: good
rupture time of the emulsion on coated plates (mn): about 30

The amount of salted out liquid is small, and it is essentially water. The time of rupture of the emulsion on coated plate is about 30 minutes for a rupture index of 70. The cationic emulsion thus produced has a behavior deemed satisfactory with regard to the rupture phenomenon.

EXAMPLE 2

In this example, which represents a second control example, there were prepared three cationic emulsions (tests I, II and III) at 70% of a bituminous binder of the bitumen/polymer type constituted by a reaction product at elevated temperature of a road bitumen of 80/100 penetration with a mother solution consisting of a solution of sulfur and a block copolymer of styrene and butadiene, containing 25% styrene and 75% butadiene in a petroleum fraction obtained in refinery after catalytic cracking of the heavy distillates called "Light Cycle Oil", said fraction having a distillation range on the order of from 180° C. to 360° C.

For preparing the bitumen/polymer binder, the work was carried out as follows. Twenty parts of block copolymer were dissolved in 80 parts of the petroleum fraction at a temperature comprised between 80° C. and 100° C. After the polymer was completely dissolved, 0.6 part of sulfur was added to the solution. Fifteen parts of the solution thus were mixed with 85 parts of the road bitumen and the mixture was brought to a temperature comprised between 170° C. and 180° C. for about 1.5 hours. There was thus obtained a bitumen/polymer binder, the main characteristics of which are indicated herebelow.

| | |
|---|---|
| viscosity at 160° C. | 89 mPa.s |
| pseudo-viscosity at 50° C. with an orifice of 10 mm (NF T 66 005) | 115 seconds |
| traction test at - 10° C. with a speed of 500 mm/mn | |

Stress at threshold: $5.7 \times 10^5$Pa
Stress at breakage; $1.07 \times 10^5$Pa
Elongation at threshold: 20%
Elongation at breakage: >900%

The bitumen polymer binder was emulsified by the following procedure.

There are formed in the first place an aqueous phase consisting of an aqueous solution of hydrochloride of the emulsifying agent, producing a dispersion of propylene diamine-1,3 of tallow (cationic nitrogenized emulsifying agent) in industrial water, thereafter adding to the dispersion 0.14% hydrochloric acid at 20° Be.

Percentages in the aqueous phase of the amounts of emulsifier and hydrochloric acid employed, represented respectively, 0.15% and 0.14% for case I; 0.25% and 0.21% for case II and 0.08% and 0.06% for case III.

The emulsion was then produced in an emulsifier in which there were simultaneously and separately introduced 300 parts of the aqueous phase prepared as indicated above and brought to 45° C., and 700 parts of the bitumen brought to 145° C.

There were obtained 1000 parts of control cationic emulsions of which the characteristics are given below:

| Test | I | II | III |
|---|---|---|---|
| pH | 3.5 | 4 | 4.2 |
| medium diameter of the globules of binder (μm) | 3–5 | 3–5 | 3–6 |
| rupture index | 50 | 80 | 40 |
| quantity of salted out liquid after 1 hour (% of the emulsion) | 35 | 21 | 45 |
| quantity of water in the salted out liquid (%) | 32 | 60 | 32 |

-continued

| Test | I | II | III |
|---|---|---|---|
| cohesiveness of the clot | zero | zero | zero |
| time of rupture of the emulsion on plates of coated products (mn) | >180 | >180 | >180 | in the three tests all the bitumen/polymer binder is emulsified and the cationic emulsions produced have a good stability in storage.

On the other hand, although in the three emulsions the values of the index of rupture were from quick to very quick ruptures, the quantity of salted out liquid in the test for determining said index is considerable and this liquid contains a high rate of non-ruptured emulsions. Besides, the clot of the mixture of sand and bitumen/polymer binder formed after rupture of the emulsion shows no cohesiveness and in addition the time of rupture of the emulsion on plates of coated material is considerable in each case.

ExAMPLES 3 to 5

In these examples cationic emulsions according to the invention were prepared with 70% of a bituminous binder of the bitumen/polymer type identical with the one described in Example 2.

The bitumen/polymer binder was emulsified using the mode of operation that follows.

There was first formed an aqueous phase consisting of an aqueous solution of the hydrochloride of the emulsifying agent by producing a dispersion of the emulsifying agent in industrial water (Example 3) or in city water (Examples 4 and 5), and then adding to the dispersion, counted in percents of the aqueous phase, 0.13% of hydrochloric acid of 20° Be, then 0.2% of an aqueous solution with 40% tetrapotassium salt of hydroxypropane-1,1 diphosphonic acid.

The emulsifying agent used consisted of a mixture of tallow propylene - 1,3 diamine (emulsifying agent of type A) and of a tallow polypropylene polyamine sold under the name of LILAMULS EM30 (emulsifying agent of type B) in quantities respectively representing, in percents of the aqueous phase, 0.015% and 0.135% in Examples 3 and 4, and 0.16% and 0.02% in Example 5. The aqueous phase obtained in each case was limpid.

The emulsion was then produced in an emulsifier in which there were simultaneously and separately introduced 300 parts of the aqueous phase prepared as indicated above and brought to 45° C. and 700 parts of the bitumen/polymer binder brought to 145° C.

In each example there were obtained 1000 parts of cationic emulsions, the characteristics of which are given herebelow.

| Example | 3 | 4 | 5 |
|---|---|---|---|
| pH | 5 | 5.2 | 5.3 |
| medium diameter of the binder globules (μm) | 4–7 | 3–6 | 3–7 |
| rupture index | 60 | 60 | 65 |
| amount of salted out liquid after 1 hour (% of the emulsion) | 7 | 7 | 9 |
| amount of water in the salted out liquid (%) | 95 | 95 | 97 |
| cohesiveness of the clot | strong elasticity | strong elasticity | strong elasticity |
| time of rupture of the emulsion on plates of coated products (mn) | 30–60 | 30–60 | 30–60 |

For the three examples all the bitumen/polymer binder was emulsified and the stability in storage of the emulsions produced is good.

The rupture indices of the emulsions are low, and there was found a behavior of the emulsions similar to that of an ordinary bitumen emulsion, namely, small amount of salted out liquid phase and small amount of non-ruptured emulsion.

Besides, the clot of sand and bitumen/polymer obtained in the course of the test for determining the rupture index showed a strong cohesiveness-elasticity and can be subjected to a characterization by traction test.

Herebelow are given the traction characteristics of the clot resulting from the rupture of the emulsion of Example 3 in the course of the test for determining the rupture index, the traction test having been carried out according to the standard NF T 46 002, working at 0° C. with a traction speed of 500 mm/mn.

Stress at threshold: $2.55 \times 10^5$ Pa
Stress at breakage: $0.68 \times 10^5$ Pa
Elongation at threshold: 15%
Elongation at breakage: 570%

EXAMPLE 6

There was prepared a cationic emulsion of a bituminous binder of the bitumen/polymer type obtained as described in Example 2, but replacing the petroleum fraction "Light Cycle Oil" by the same amount of an anthracenic coal oil having a distillation range on the order of from 200° to 400° C.

The emulsion was prepared as follows:

There was first formed an aqueous dispersion of emulsifying agent by dispersing in industrial water a mixture of cationic nitrogenized emulsifying agents consisting of stearic propylene amidoamine (emulsifying agent of type A) and an alkyl amidopolyamine sold under the name of EMULSAMINE L 60 (emulsifying agent of type B), said emulsifying agents being used in amounts respectively representing 0.02% and 0.15% of the aqueous dispersion. There were then introduced in to the dispersion, expressed in percents of the latter, 0.2% of an aqueous solution with 40% of tetrapotassium salt of hydroxypropane-1,1 diphosphonic acid and then 0.25% of an acetic acid solution at 96% (density =1.06). There was obtained a limpid aqueous phase.

In the emulsifier there was separately and simultaneously introduced 300 parts of the aqueous phase prepared as indicated above and brought to 45° C. and 700 parts of the bitumen/polymer binder brought to 145° C.

There were obtained 1000 parts of cationic emulsion having the characteristics given herebelow.
PH: 5.6
medium diameter of the globules of binder (μM): 3–6
rupture index: 60
quantity of liquid salted out after 1 hour (% of the emulsion): 6
quantity of water in the salted out liquid (%): 98
cohesiveness of the clot: great elasticity
time of rupture of the emulsion on plates of coated product (mn): 3014 60

The whole binder is emulsified and the stability in storage of the emulsion produced is good.

The rupture index of the emulsion is low and the rupture of the emulsion is accompanied by the salting out of a reduced amount of liquid containing little of the non-ruptured emulsion. Besides, the clot of sand and bitumen/polymer binder obtained in the course of the test for determining the index of rupture has a strong cohesiveness-elasticity.

EXAMPLE 7

There was prepared a cationic emulsion of a bituminous binder of the bitumen/polymer type obtained by mixing a road bitumen of 80/100 penetration with a ethylene/vinyl acetate copolymer containing 45% vinyl acetate. The binder was prepared by dispersing, by stirring and for about 2 hours, 50 parts of the copolymer in 950 parts of the bitumen brought to 180° C., then fluidizing the homogeneous solution obtained by adding 10% of an anthracenic coal oil having a distillation range on the order of from 200° to 300° C. The main characteristics of the binder obtained are indicated herebelow:

viscosity at 160° C.: 0.97 mPa.s
pseudo-viscosity at 50+ C. with an orifice of 10 mm (NF T 66 005): 128 seconds
traction test at −10° C. with a speed of 500 mm/mn
Stress at threshold: $12.3 \times 10^5$ Pa
Stress at breakage: $6.3 \times 10^5$ Pa
Elongation at threshold: 15%
Elongation at breakage: 320%

The binder was emulsified by following the mode of operation described in Example 6.

There were obtained 1000 parts of cationic emulsion of bitumen/polymer binder having the characteristics given herebelow.

pH: 5.5
medium diameter of the globules of binder ($\mu$m): 3–6
rupture index: 58
quantity of salted out liquid after 1 hour (% of the emulsion): 6
quantity of water in the salted out liquid (%): 99
cohesiveness of the clot: strong cohesiveness
time of rupture of the emulsion on plates of coated product (mn): 30–60

All of the binder is emulsified during the preparation of the emulsion and the stability in storage of the emulsion produced is good.

The rupture index of the emulsion is low and the rupture of the emulsion is accompanied by the salting out of a reduced amount of liquid containing very little of the non-ruptured emulsion. Additionally, the clot of sand and bitumen/polymer binder obtained in the course of the test for determining the rupture index has a strong cohesiveness.

EXAMPLE 8

There were prepared two cationic emulsions of a bituminous binder of the bitumen/polymer type obtained by mixing a road bitumen of penetration 80/100 with a stellate triblock copolymer styrene/butadiene/styrene sold under the name of SOLPRENE 411 by PHILLIPS PETROLEUM. The binder was prepared by dispersing, by stirring for 2 hours, three parts of the copolymer in 100 parts of the bitumen brought to 180° C., then fluidizing the homogeneous solution obtained by adding 12% of a petroleum fraction of the "light Cycle Oil" type having a range of distillation of from 180° C. to 360° C. The main characteristics of the binder obtained are given herebelow:

viscosity at 160° C.: 102 mPa.s
pseudo-viscosity at 50° C. with an orifice of 10 mm (NF T 66005): 132 seconds
traction test at −10° C. with a traction speed of 500 mm/mn
Stress at threshold: $7.1 \times 10^5$ Pa
Stress at breakage: $0.05 \times 10^5$ Pa
Elongation at threshold: 20%
Elongation at breakage: 800%

The bitumen/polymer binder was emulsified by making use either of the procedure of example 6 according to the invention (test 8.I) or of the procedure of the control Example 2 (test 8.II).

In each case there were obtained 1000 parts of a cationic emulsion of the bitumen/polymer binder having the characteristics stated herebelow:

| test | 8.I | 8.II |
|---|---|---|
| pH | 5.4 | 3.7 |
| medium diameter of the globules of binder ($\mu$m) | 4–7 | 3–6 |
| rupture index | 60 | 63 |
| quantity of liquid salted out after 1 hour (% of the emulsion) | 7 | 33 |
| quantity of water in the salted out liquid (%) | 95 | 32 |
| cohesiveness of the clot | strong elasticity | zero |
| time of rupture of the emulsion on plates of coated product (mn) | 30–60 | >180 |

In each one of the tests all of the binder was emulsified during the preparation of the emulsion and the stability in storage of the emulsion produced is good.

For the emulsion of test 8.I according to the invention the rupture index of the emulsion is low and the rupture of the emulsion is accompanied by salting out of reduced amount of liquid containing very little of non-ruptured emulsion. Besides, the clot of sand and bitumen/polymer binder obtained in the course of the test for determining the rupture index has a strong elasticity.

The traction characteristics of this clot obtained by traction test following the standard NF T 46002 working at 0° C. with a traction speed of 500 mm/mn are the following:

Stress at threshold: $3.05 \times 10^5$ Pa
Stress at breakage: $0.38 \times 10^5$ Pa
Elongation at threshold: 15%
Elongation at breakage: 180%

For the control emulsion of test 8.II, the rupture index has a value approximate to that of the emulsion of test 8.I, but the rupture of the emulsion is accompanied by the salting out of a considerable amount of liquid containing a great proportion of non-ruptured emulsion. In addition, the clot of sand and bitumen/polymer binder obtained in the course of the test for determining the rupture index has no cohesiveness at all. Finally, the time of rupture of the emulsion on plates of coated products is much longer than that measured for the emulsion of test 8.I according to the invention.

EXAMPLE 9

A bituminous binder of the bitumen/polymer type was prepared by mixing 80 parts of a road bitumen of penetration 80/100 brought to 180° C. with 20 parts of a vulcanized mother solution formed from a hydrocarbon solvent, a block copolymer of styrene and butadiene and sulfur as indicated in French Pat. No. 7,910,987 (Publication No. 2,455,623) of May 2, 1979.

The bitumen/polymer binder obtained had the following characteristics:
viscosity at 160° C.: 0.60 mPa.s
pseudo-viscosity at 50° C. with an orifice of 10 mm (NF T 66 005): 78 seconds traction test at 0° C. with a traction speed of 500 mm/mn
Stress at threadhold: $2{,}55 \times 10^5$ pa
Stress at breakage: $0{,}14 \times 10^5$ Pa
Stress at threshold: $2.55 \times 10^5$ Pa
Stress at breakage: $0.14 \times 10^5$ Pa
Elongation at threshold: 15%
Elongation at breakage: >900%

From the bitumen/polymer binder thus obtained, there were prepared two cationic emulsions by making use either of the procedure of example 6 (test 9.I) or of the procedure of the control Example 2 (test 9.II) In each case there were obtained 1000 parts of a cationic emulsion of the bituminous binder of the bitumen/polymer type having the following characteristics:

| test | 9.I | 9.II |
|---|---|---|
| pH | 5.5 | 3.8 |
| medium diameter of the globules of binder (μm) | 3–6 | 3–6 |
| rupture index | 57 | 58 |
| quantity of liquid salted out after 1 hour (% of the emulsion) | 6 | 37 |
| quantity of water in the liquid salted out (%) | 97 | 32 |
| cohesivesness of the clot | good cohesiveness | zero |
| time of rupture of the emulsion on plates of coated product (mn) | 30–60 | >180 |

In each one of the tests all of the binder is emulsified during the preparation of the emulsion and the stability in storage of the emulsion obtained is good.

For the emulsion of test 9.I according to the invention the rupture index of the emulsion is low and the rupture of the emulsion is accompanied by salting out of a reduced amount of liquid containing very little of non-ruptured emulsion. Additionally, the clot of sand and bitumen/polymer binder obtained in the course of the test for determining the rupture index has a good cohesiveness.

The traction characteristics of this clot obtained by traction test according to standard NF T 46002, working at 10° C. with a traction speed of 500 mm/mn are the following:
Stress at threshold: $3.3 \times 10^5$ Pa
Stress at breakage: $0.27 \times 10^5$ Pa
Elongation at threshold: 10%
Elongation at breakage: 230%

For the control emulsion of test 9.II, the rupture index has a value comparable to that of the emulsion of test 9.I, but the rupture of the emulsion is accompanied by salting out of a considerable amount of liquid containing a substantial proportion of non-ruptured emulsion. Besides, the clot of sand and bitumen/polymer binder obtained in the course of the test for determining the rupture index has no cohesiveness at all. Finally, the time of rupture of the emulsion on plates of coated product is much longer than that measured for the emulsion of test 9.I according to the invention.

EXAMPLE 10

From the bitumen/polymer binder obtained as described in Example 2, there was prepared a cationic emulsion according to the invention with 70% of said binder following the mode of operation defined in Example 5, but with two modifications, namely, the use by way of emulsifying agent of a mixture of dimethyl benzyl ammonium tallow chloride sold under the name of NORAMIUM S 75 by the firm CECA and of tallow polypropylene polyamine (LILAMULS EM 30) in respective quantities representing 0.17% and 0.1% of the aqueous phase, and the use of an amount of hydrochloric acid representing only 0.1% of the aqueous phase.

There were obtained 1000 parts of cationic emulsion having the following characteristics:
PH: 5.6
medium diameter of the globules of binder (μm): 3–6
rupture index: 50
quantity of liquid salted out after 1 hour (% of the emulsion): 10
quantity of water in the liquid salted out (%): 97
cohesiveness of the clot: great elasticity
time of rupture of the emulsion on plates of coated product (mn): 30–60

All of the bitumen/polymer binder was emulsified and the stability in storage of the emulsion produced is good.

The rupture index of the emulsion is low and there is found a behavior of the emulsion similar to that of an ordinary bitumen, namely, small amounts of salted out liquid phase and little of non-ruptured emulsion.

Besides, the clot of sand and bitumen/polymer binder obtained in the course of the test for determining the rupture index has a strong cohesiveness-elasticity characterized by traction test.

EXAMPLE 11

From the bitumen/polymer binder obtained as described in Example 2, there was prepared a cationic emulsion according to the invention with 70% of said binder as follows.

There was first formed a mixture of 45 parts of dimethyl benzyl ammonium tallow chloride (NORAMIUM S 75), 25 parts of tallow polypropylene polyamine (LILAMULS EM 30), 25 parts of an aqueous solution with 40% tetrapotassium salts of hydroxypropane-1, 1-diphosphonic acid and 67 parts of an aqueous solution with 30% of a thickening agent consisting of arabic gum.

An aqueous phase was prepared by incorporating 0.4 part of the mixture thus produced into 100 parts of city water and then adding to the dispersion 0.1 part of hydrochloric acid at 20° Be.

The emulsion was then produced in an emulsifier in which were simultaneously and separately introduced 300 parts of the aqueous phase prepared as indicated above and brought to 45° C. and 700 parts of the bitumen/polymer binder brought to 145° C.

The cationic emulsion obtained had characteristics similar to those of the cationic emulsion obtained in example 10 although its viscosity was higher, namely, above 100 centistokes.

All of the bitumen/polymer binder was emulsified and the stability in storage of the emulsion produced was good.

What is claimed is:
1. A cationic emulsifying system which contains a cationic nitrogen containing emulsifying agent consisting essentially of at least one cationic nitrogen-containing emulsifying agent and an adjuvant consisting essentially of at least one water-soluble sequestering salt of phosphonic acid or the acid precursor of said salt, said salt having a sequestration power in respect to the metallic ions that is equivalent, within the pH range of from 3 to 9, to a fixation of at least 5 mg of calcium ions per gram of salt and having the formula

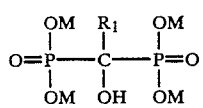

wherein $R^1$ represents a hydrocarbyl radical group having from $C_1$ to $C_{10}$, and each M, which can be identical or different, designates a hydrogen atom or an $M_1$ group and wherein at lest one M group comprises a $M_1$ group, said $M_1$ group representing a member selected from the group consisting of alkali metal atoms, a radical $—NH_3—NH_2$ and a radical of the formula

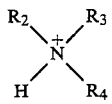

wherein $R_3$ and $R_4$, can be identical or different, and each represents a hydrogen atom or a hydrocarbyl monovalent radical having from $C_1$ to $C_8$, which can be substituted with functional groups and wherein two of $R_3$ and $R_4$ can form a heterocycle with the nitrogen atom to which they are bonded, the weight of cationic emulsifying agent representing from about 10% to about 99% of the total weight of emulsifying agent and phosphonic adjuvant.

2. An emulsifying system according to claim 1 wherein Ra and Ra are hydrocarbyl radicals of from $C_1$ to $C_6$ and said alkali metal atom is sodium or potassium.

3. An emulsifying system according to claim 1, wherein $R_1$ is an alkyl, aryl, or cycloalkyl radical.

4. An emulsifying system according to claim 1 wherein the hydrocarbyl radicals that can represent the symbols $R_2$ to $R_4$ are alkyl or hydroxyalkyl radicals from $C_1$ to $C_8$, cycloalkyl radicals from $C_4$ to $C_8$, or aromatic radicals from $C_6$ to $C_8$, and wherein some of the $R_2$ to $R_4$ radicals can form an aromatic or alicyclic heterocycle with the nitrogen atom to which they are bonded heterocycle, with the nitrogen atom to which they are bonded.

5. An emulsifying systems according to claim 4 wherein said $R_2$ to $R_4$ are from $C_1$ to $C_6$.

6. An emulsifying system according to claim 1 wherein the emulsifying agent represents from 25 to 90% of the total weight of emulsifying agent and phosphonic adjuvant.

7. An emulsifying system according to claim 1 wherein the cationic nitrogen containing emulsifying agent comprises at least one cationic nitrogen containing emulsifying agent selected from the group consisting of fatty monoamines, polyamines, amidoamines, amidopolyamines, salts or oxides of said amines and amidoamines and reaction products of said compounds with ethylene and/or propylene oxide.

8. An emulsifying system according to claim 1 wherein the cationic nitrogen containing emulsifying agent consists essentially of at least one cationic nitrogen containing emulsifying agent selected from the group consisting of fatty monoamines of the formula $R_6-NH_2$, wherein $R_6$ represents a fatty hydrocarbon radical selected from alkyl or alkenyl radicals having from $C_8$ to $C_{22}$ and polyamines and amiodopolyamines of the formula $$R—X—(C_nH_{2n})—NH_2$$

wherein X represents a bivalent group of the formula

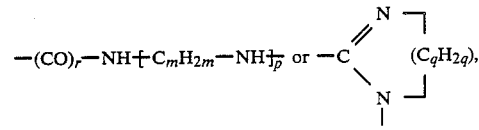

wherein R is a hydrocarbyl radical, having up to 22 carbon atoms, m and n, can be identical or different, and are integers from 1 to 8, p has a value of from 0 to 6, r is 0 to 1 and q is an integer from 2 to 10.

9. An emulsifying system according to claim 8 wherein R is alkyl or alkenyl of from $C_8$ to $C_{22}$; m and n are integers of from 1 to 6; p has a value of from 0 to 3; and q is an integer of from 2 to 4.

10. An emulsifying system according to claim 1 wherein the cationic nitrogen containing emulsifying agent is formed by association of at least one emulsifying agent A selected from the group consisting of monoamines, diamines, amidoamines, oxides of said amines and amidoamines, reaction products of said compounds with at least one of ethylene oxide and propylene oxide and quaternary ammonium salts with at least one emulsifying agent $R_1$ is selected from the group consisting of cationic nitrogen containing emulsifying agents having in their molecule at least three functional groups selected from the group consisting of amine and amide groups in a manner such that at least one of said functional groups is an amine group.

11. An emulsifying system according to claim 10, wherein the weight ratio of the total quantity of the compound B or the compounds A to the total quantity of the Compounds A and B is from 5% to 95%.

12. An emulsifying system according to claim 10 wherein the emulsifying agent A comprises at least one member selected from the group consisting of monoamines of formula $R_6\,NH_2$, diamines and amidoamines of the formula

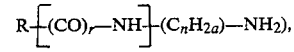

amines of the formula

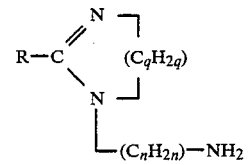

and quaternary ammonium compounds of the formula $(R_7)_jN^+(R_8)_hy^-$ and the emulsifying agent B comprises at least one member selected from the group consisting of polyamines and amidopolyamines of the formula $$R—(CO)r—NH—C_mH_{2m}—NH_s—(C_nH_{2n})—NH_2$$

wherein R represents a hydrocarbyl radical, having up to 22 carbon atoms, m and n, can be identical or different, being integers from 1 to 8, r is 0 to 1, q is an integer from 2 to 10, s is an integer from 1 to 6, and each R₇, can be identical or different, and designate a C₆ to C₂₂ hydrocarbyl radical which can be substituted with one or more functional groups, said hydrocarbyl radicals being selected from alkenyl or alkyl radicals of from C₆ to C₂₂ or a benzyl radical, each R₈ can be identical or different and represents alkyl or hydroxyalkyl radicals having from C₁ to C₆, Y⁻ is an anion of a mineral or organic acid, h is a number equal to (4−j) and j is a number having a value 1,2, or 3.

13. An emulsifying system according to claim 12 wherein R is alkyl or alkenyl of from C₈ to C₂₂; m and n are integers of from 1 to 6; q is an integer of from 2 to 4; s is an integer of from 1 to 3; Y⁻ is an anion selected from the group consisting of chloride, acetate and formate.

14. An emulsifying system according to claim 10 wherein the emulsifying agent comprises at least one compound selected from compounds of the formula:

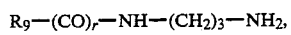

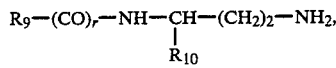

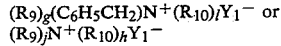

wherein R₉ is an alkyl or alkenyl radical from C₁₂ to C₂₂, R₁₀ is an alkyl or hydroxyalkyl radical from C₁ to C₃ — y is a chloride or acetate anion, 1 is a number equal to (3−g), g is a number 1,2 or 3, r is 0 or 1, h is (4−j) and j is 1,2 or 3.

15. An emulsifying system according to claim 14 wherein R₉ is stearyl or oleyl.

16. An emulsifying system according to claim 10 wherein the emulsifying agent B comprises at least one compound of the formulae

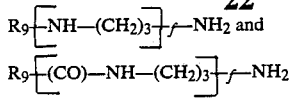

wherein f designates a number 2, 3, 4 or 5 or R₉ represents an alkyl or alkenyl radical of from C₁₂ to C₂₂.

17. An emulsifying system according to claim 16 wherein R₉ is stearyl or oleyl.

18. An emulsifying system according to claim 1 additionally containing at least one thickening agent selected from the group consisting of water-soluble organic compounds capable, within a pH range from 3 to 9, of increasing the viscosity of a cationic emulsion of bitumen/polymer binder without modifying the viscosity of the aqueous phase along of said emulsion.

19. An emulsifying system according to claim 18, wherein said thickening agent is a water-soluble natural gum.

20. An emulsifying system according to claim 18, wherein said thickening agent is a water-soluble polyurethane of low molecular weight, formed by the reaction of a polyisocyanate with a polyester-polyol or a polyether polyol.

21. An emulsifying system according to claim 20 wherein the polyurethane has a molecular weight below 20,000.

22. An emulsifying system according to claim 18 wherein the weight of thickening agent is from 5 to 30% of the total weight of the combination formed by the cationic nitrogen containing emulsifying agent, the phosphonic adjuvant and the thickener.

23. An emulsifying system of claim 22 wherein the thickening agent is a water-soluble natural gum.

24. An emulsifying system according to claim 4 wherein the aromatic or alicyclic heterocycle is a pyridinic or piperidinic heterocycle.

25. An emulsifying system according to claim 12 wherein the hydrocarboyl radical is an alkenyl or alkyl radical of from C₆ to C₂₂ or a benzyl radical.

* * * * *

UNITED STATES PATENT AND TRADEMARK OFFICE
CERTIFICATE OF CORRECTION

PATENT NO. : 4,970,025

DATED : November 13, 1990

INVENTOR(S) : Francis Demangeon, et al

It is certified that error appears in the above-identified patent and that said Letters Patent is hereby corrected as shown below:

Column 5, line 8: "alyl" should read --alkyl-- line 17: after "pyridinic" insert --type-- line 38: "having" should read --have--

Column 7, line 1: formula (VIII) should read line 41: formula (XIII) should read

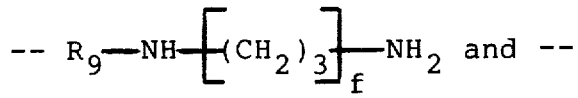

line 44: formula (XIV) should read

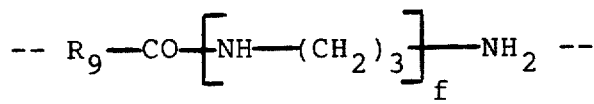

Column 9, line 10: "bring" should read --bringing--

Column 10, line 15: after "other" insert --hand--

Column 13, line 21: "ExAMPLES" should read --EXAMPLES--

Column 14, line 54: "$\mu M$" should read --$\mu m$-- line 61: "301460" should read --30-60--

UNITED STATES PATENT AND TRADEMARK OFFICE
CERTIFICATE OF CORRECTION

PATENT NO. : 4,970,025

DATED : November 13, 1990

INVENTOR(S) : Francis Demangeon, et al

It is certified that error appears in the above-identified patent and that said Letters Patent is hereby corrected as shown below:

Column 15, line 18: "50+C" should read --50°C--

Column 17, lines 3-4: cancel these two lines line 25: "cohesivesness" should read --cohesiveness--

Column 18, line 40: "salts" should read --salt--

Claim 1, column 19, line 15: the formula "$-NH_3-NH_2$" should read -- $-\overset{+}{N}H_3-NH_2$ -- line 23: "$R_3$ and $R_4$" should read --$R_2$ to $R_4$-- line 26: "$R_3$ and $R_4$ should read --$R_2$ to $R_4$ --

Claim 2, column 19, line 32: "$R_3$ and $R_4$" should read --$R_2$ to $R_4$ --

Claim 4, column 19, line 44: add a period after "bonded" and cancel remaining part of the claim Claim 8, column 19, line 67: "amiodopolyamines" should read --amidopolyamines-- column 20, line 17: "0 to 1" should read --0 or 1--

UNITED STATES PATENT AND TRADEMARK OFFICE
CERTIFICATE OF CORRECTION

PATENT NO. : 4,970,025
DATED : November 13, 1990
INVENTOR(S) : Francis Demangeon, et al It is certified that error appears in the above-identified patent and that said Letters Patent is hereby corrected as shown below:

Claim 10, column 20, line 30: "$R_1$ is" should read --B--

Claim 12, column 20, line 46: the formula should read line 64: the formula should read

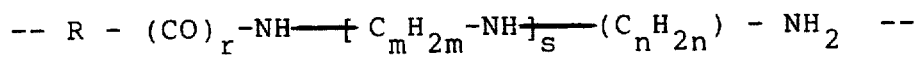

line 68: "0 to 1" should read --0 or 1--

Claim 14, column 21, line 31: "$C_3$-Y" should read --$C_3, Y_1$--

Claim 16, column 22, lines 1 and 2; the formulas should read:

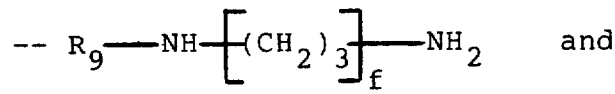   and

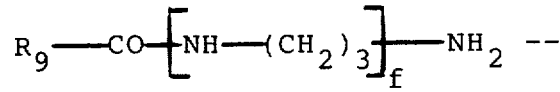

column 22, line 5: "5 or $R_9$" should read --5 and $R_9$--

UNITED STATES PATENT AND TRADEMARK OFFICE
CERTIFICATE OF CORRECTION

PATENT NO. : 4,970,025

DATED : November 13, 1990

INVENTOR(S) : Francis Demangeon, et al.

It is certified that error appears in the above-identified patent and that said Letters Patent is hereby corrected as shown below:

Claim 18, column 22, line 15: "along" should read --alone--.

Signed and Sealed this

Eighth Day of September, 1992

Attest:

DOUGLAS B. COMER

*Attesting Officer*     *Acting Commissioner of Patents and Trademarks*